US012764445B2

(12) United States Patent
Straub et al.

(10) Patent No.: US 12,764,445 B2
(45) Date of Patent: Oct. 13, 2026

(54) PON WITH ACTIVE ADAPTION OF OPTICAL DISTRIBUTION NETWORK

(71) Applicant: Nokia Solutions and Networks Oy, Espoo (FI)

(72) Inventors: Michael Straub, Maulbronn (DE); Rene Bonk, Pforzheim (DE); Thomas Pfeiffer, Stuttgart (DE)

(73) Assignee: Nokia Solutions and Networks Oy, Espoo (FI)

( * ) Notice: Subject to any disclaimer, the term of this patent is extended or adjusted under 35 U.S.C. 154(b) by 272 days.

(21) Appl. No.: 18/606,682

(22) Filed: Mar. 15, 2024

(65) Prior Publication Data

US 2024/0334097 A1 Oct. 3, 2024

(30) Foreign Application Priority Data

Mar. 31, 2023 (EP) .................................... 23166125

(51) Int. Cl.
*H04Q 11/00* (2006.01)
*H04L 43/0876* (2022.01)
(Continued)

(52) U.S. Cl.
CPC ..... *H04Q 11/0067* (2013.01); *H04L 43/0876* (2013.01); *H04L 47/38* (2013.01);
(Continued)

(58) Field of Classification Search
CPC ....... H04Q 11/0067; H04Q 2011/0049; H04Q 2011/0064; H04Q 2011/0084;
(Continued)

(56) References Cited

U.S. PATENT DOCUMENTS

2003/0095314 A1* 5/2003 Shimada ................ H04B 10/27 398/141
2011/0217041 A1* 9/2011 Yoshida .................. H04L 47/10 398/58
(Continued)

*Primary Examiner* — Dibson J Sanchez
(74) *Attorney, Agent, or Firm* — Harness, Dickey & Pierce, P.L.C.

(57) ABSTRACT

This application relates to a method for managing traffic flow in a passive optical network (PON) which connects an optical line terminal (OLT) to a plurality of optical network units (ONUs) via an optical distribution network (ODN). The method may comprise obtaining one or more optimization parameters for a target state of the PON. The method may also comprise determining for one or more or each of the ONUs, a respective modulation scheme for communicating data between the OLT and that ONU. The method may further comprise determining a respective power distribution ratio for a distributive element of the ODN for one or more of the ONUs based on the determined modulation scheme and the one or more optimization parameters. Specifically, the distributive element may have a first port and a plurality of second ports. In particular, the first port may be associated with signal transmission between the OLT and the ODN, and each second port may be associated with signal transmission between the ODN and a respective ONU or a respective group of ONUs. Besides, each of the second ports of the distributive element may be associated with a power distribution ratio of optical power at that second port to optical power at the first port of the distributive element. Furthermore, the method may comprise adjusting a respective branch power for the one or more of the ONUs based on the determined power distribution ratio for communicating data between the OLT and the one or more of the ONUs.

15 Claims, 10 Drawing Sheets

(51) Int. Cl.
*H04L 47/38* (2022.01)
*H04B 10/272* (2013.01)
*H04B 10/516* (2013.01)

(52) U.S. Cl.
CPC .......... *H04B 10/272* (2013.01); *H04B 10/516* (2013.01); *H04B 10/5161* (2013.01); *H04Q 2011/0049* (2013.01); *H04Q 11/0062* (2013.01); *H04Q 2011/0064* (2013.01); *H04Q 2011/0084* (2013.01); *H04Q 2011/0086* (2013.01)

(58) Field of Classification Search
CPC ....... H04Q 2011/0086; H04Q 11/0062; H04Q 11/0003; H04Q 2011/0079; H04Q 2213/03; H04L 43/0876; H04L 47/38; H04L 1/004; H04B 10/516; H04B 10/272; H04B 10/5161
USPC .................................... 398/43–103, 182–201
See application file for complete search history.

(56) References Cited

U.S. PATENT DOCUMENTS

| | | | | |
|---|---|---|---|---|
| 2012/0106952 | A1* | 5/2012 | Xu | H04Q 11/0067 398/28 |
| 2014/0294388 | A1* | 10/2014 | Odaka | H04J 3/1694 398/66 |
| 2018/0332373 | A1* | 11/2018 | Wey | H04Q 11/0067 |
| 2018/0343065 | A1* | 11/2018 | Li | H04B 10/516 |
| 2021/0028857 | A1* | 1/2021 | Inuzuka | H04B 10/25 |
| 2021/0194589 | A1* | 6/2021 | Kawakita | H04L 12/44 |
| 2022/0166532 | A1* | 5/2022 | Kawakita | G02B 6/2856 |
| 2022/0381989 | A1* | 12/2022 | Bliss | G02B 6/2852 |
| 2023/0082934 | A1* | 3/2023 | Hara | H04B 10/25891 398/142 |
| 2023/0136577 | A1* | 5/2023 | Bourg | H04B 10/27 398/156 |
| 2023/0146851 | A1* | 5/2023 | Hatano | H04B 10/614 398/208 |
| 2023/0261750 | A1* | 8/2023 | Igarashi | H04B 10/272 398/66 |
| 2024/0414460 | A1* | 12/2024 | Ye | H04Q 11/0067 |

* cited by examiner

PON WITH ACTIVE ADAPTION OF OPTICAL DISTRIBUTION NETWORK

TECHNICAL FIELD

This application relates to optical data communications in a Passive Optical Network (PON), and more particularly, to methods and systems for traffic management in a PON connecting optical network units (ONUs) to an optical line termination (OLT) through shared links of an optical distribution network (ODN).

BACKGROUND

Shared access solutions such as passive optical networks (PONs) are widely used to enable broadband connections to the Internet. A passive optical network (PON) is typically a tree and branch network that connects a central office (CO, also known as an optical line terminal (OLT)) to multiple end points, e.g., optical network units (ONUs) or optical network terminals (ONTs), via an optical distribution network (ODN). Within standard PON solutions, all ONUs/ONTs are designed for a defined ODN attenuation range, but most of the ONUs/ONTs do not exploit the loss budget fully, i.e., they still show some margin.

Nowadays ODNs are fully passive and static. A PON system needs to cope with the attenuation limits given by the ODN and thus, different loss-budget classes for PON systems are present to match with the ODN deployment class. There are no further adaptations that can be made once the ODNs are installed. Such standard PON solutions have remained unchanged, i.e., the overall structure and the procedure for PON operations have been kept almost the same, during the evolution of PON systems over multiple system generations.

While the physical connections of a PON stay static for all users (end points), flexibility in terms of variable net line rates up to the ODN limits has been introduced for throughput adaptation. Such a flexible-rate PON system may comprise flexible modulation and flexible forward error correction (FEC) code, which uses the available margins of typically 8 dB (which is the maximum margin distribution comprising the margin of ODN deployment and transceiver TRx) to increase the net data rate ("flexible-rate"), thereby adapting the throughput for groups of ONUs according to channel conditions. For example, in order to boost the throughput significantly, a margin of 7 to 8 dB may be required to increase the level of a pulse-amplitude-modulation format applied for transmission, e.g., to change the modulation format from PAM2 to PAM4. However, even with smaller margins the "flexible-rate" feature of the flexible FEC can still be applied to boost the throughput to lower extent in comparison to change of the flexible modulation (which may offer a factor of two for capacity improvement). However, such a flexible-rate approach of leveraging the margins is fully opportunistic and strictly dependent on the operator network design. In other words, a significant portion of ONUs experiencing higher loss, i.e., offering less margins, will only be able to exploit the flexible FEC feature as part of the flexible rate adjustment.

In view of the standard PON approach where the system and the ODN are both static with overall system performance limited by the ODN, and in view of the flexible-rate PON approach where the system is flexible to provide variable line rates up to the limits set by the static ODN, it is desirable to enable full flexibility in a PON system where both the system and the ODN are flexible to overcome these limitations per customer and thus to meet the customers' service requirements.

SUMMARY

According to the needs as indicated above, the present disclosure proposes methods and means for managing traffic flow in a passive optical network (PON), for example, in a flexible-rate PON system, to provide for full flexibility in an optical communications network. In particular, the deployment of the optical distribution network (ODN) is to be made variable to enhance the flexibility of the PON system which will then go beyond what has been achieved so far due to the limitations by a conventional fixed ODN. The methods and means proposed in the present disclosure may be applicable, for example, among others, to coherent PONs at higher rate that may have the feature of flexible modulation format and flexible FEC rate adjustments, and to a Flexible L (100G) based on C (50G) Symmetric PON (i.e., a FLCS-PON).

Specifically, a novel adaption means is introduced in the ODN to allow in a flexible-rate PON for adjusting various system parameters such as transmission line rates, modulation formats, coding or shaping of optical signals, FEC coding, etc. in a more liberal way to follow the bandwidth request of individual end points (e.g., ONUs, ONTs).

An aspect of the disclosure relates to a method for managing traffic flow in a passive optical network (PON). The PON may comprise an optical line terminal (OLT), an optical distribution network (ODN) and a plurality of optical network units (ONUs). Specifically, in the PON, the OLT may connect to the plurality of ONUs via the ODN. The method may comprise obtaining, at the OLT, one or more optimization parameters for a target state of the PON. More specifically, the one or more optimization parameters may be obtained from the management system, and/or by obtaining requests from one or more of the ONUs. The target state may indicate, among others, parameters and/or performance of the system (e.g., line rates, up/down-stream traffic and latency, etc.) at which the PON shall operate/reach according to customers' requests and deployment requirements/conditions, which may be determined or pre-configured at a user and/or system level. The method may further comprise determining, at the OLT, for one or more or each of the ONUs, a respective modulation scheme for transmitting (communicating) data between the OLT and that ONU. For example, different modulation schemes may be adopted for data communication with different ONUs or with different groups of ONUs.

In particular, the ODN may comprise a distributive element for distributing data carried by optical signals from the OLT to the individual ONUs or groups of ONUs. The distributive element may have a first port and a plurality of second ports. Specifically, the first port may be associated with signal transmission between the OLT and the ODN, and each second port may be associated with signal transmission between the ODN and a respective ONU or a respective group of ONUs. It should be noted that each of the second ports of the distributive element may be associated with a power distribution ratio of optical power at that second port to optical power at the first port of the distributive element.

It is further noted that the ODN may also comprise an arbitrary number of distributive elements. In some embodiments, a plurality of distributive elements may be deployed in a cascaded architecture, where each or any distributive element of any stage may have similar or the same capability, i.e., each distributive element may have a first port and a plurality of second ports, while the distributive elements at intermediate stages may have their first ports connected to a second ports of the distributive element at the preceding stage and have one or more of their second ports connected to the first port of the distributive element at the succeeding stage. In an embodiment where only one distributive element is deployed in the ODN, the distributive element may have a first port connected to the OLT and a plurality of second ports each connected to a respective ONU or a respective group of ONUs.

More specifically, the method may further comprise determining, at the OLT, a respective power distribution ratio for the distributive element(s) of the ODN connecting to one or more of the ONUs based on the determined modulation scheme and the one or more optimization parameters. The method may also comprise adjusting, at the distributive element, a respective branch power for the one or more of the ONUs based on the determined power distribution ratio for communicating data between the OLT and the one or more of the ONUs.

Configured as above, the proposed method combines the flexible-rate PON with adjustable branch power in the ODN for the ONUs, which enables configurable net data rates to meet the customers' need. In other words, by making the ODN (especially the branch power for the ONUs) a system parameter (i.e., as an input parameter fed back to the PON system), bandwidth and traffic management can be dynamically assigned to the individual end points to achieve a fully flexible PON (i.e., full-potential flexible-PON approach). In this way, the full-potential flexible PON approach allows to enhance, for example, the maximum capacity for a given aggregated network request on the physical layer.

In some embodiments, the method may further comprise determining the respective modulation schemes based on the determined power distribution ratio and varying the respective modulation schemes and/or the respective power distribution ratio until the target state of the PON is reached. In an embodiment, the method may also comprise determining, at the OLT, for each of the ONUs, a respective coding scheme and/or one or more respective forward error correction (FEC) parameters for transmitting (communicating) data between the OLT and that ONU. Moreover, the method may also comprise providing, at the OLT, the determined modulation schemes, the determined coding schemes, and/or the determined FEC parameters to the ONUs.

The determined modulation schemes, the determined coding schemes, and/or the determined FEC parameters may be provided for bandwidth provisioning to the ONUs (i.e., assigning physical-layer line rates to the ONUs). That is, the proposed method allows for physical-layer bandwidth allocation to the ONUs by allocating modulation and coding scheme according to power distribution ratios for the ONUs.

In some embodiments, the method may further comprise sending, from the OLT, the determined power distribution ratio to the distributive element of the ODN for adjusting the respective branch power. In particular, the method may comprise determining, at the OLT, the respective power distribution ratio for the one or more ONUs based on the determined coding schemes and/or the determined FEC parameters. Thus, the distributive element may receive the determined respective power distribution ratio for the one or more of the ONUs. Accordingly, the proposed method performs an optimization procedure (e.g., by means of a real-time processing engine) for a PON system which optimizes power, modulation, FEC as well as other parameter settings to allow dynamic adjustability of the PON system.

In some embodiments, the method may further comprise obtaining, at the OLT, a bandwidth request from the plurality of ONUs. The method may also comprise obtaining, at the OLT, one or more system parameters relating to a current state of the PON. Specifically, the one or more system parameters may comprise information relating to the respective branch power for communicating data between the OLT and the respective ONU. More specifically, the one or more system parameters may be obtained from the management system, and/or by obtaining requests from one or more of the ONUs. The method may also comprise determining, for each of the ONUs, the respective modulation scheme, coding scheme and/or one or more respective FEC parameters based on the bandwidth request from that ONU, the one or more system parameters, and the one or more optimization parameters.

In other words, the respective modulation schemes, coding scheme and/or one or more respective FEC parameters may be used to determine the respective power distribution ratio, and the determined power distribution ratio may be used as a feedback input parameter to the PON system for determining the respective modulation schemes, coding scheme and/or one or more respective FEC parameters. For example, the respective modulation schemes (and optionally also the coding scheme and/or one or more respective FEC parameters), and/or the respective power distribution ratio may be varied/adjusted until the target state of the PON is reached.

In some embodiments, the one or more system parameters may comprise one or more of optical power from a transceiver of an ONU and/or of the OLT, a system bit error rate, one or more FEC parameters for a transceiver of an ONU and/or of the OLT, and a coding scheme of optical signals for data communication between an ONU and the OLT.

It is noted that the proposed method may be applicable to both downlink and uplink communications in the PON. In some embodiments, for example, in the case of deployment of two or more fiber links, the distributive element may comprise an optical splitter for downstream traffic, and an optical combiner (multiplexer) for upstream traffic. In some embodiments, however, a downstream splitter may also act as a combiner for upstream as well. Specifically, the respective power distribution ratio may then comprise a respective power splitting ratio associated with the respective second port of the distributive element. In this case, the method may further comprise providing, for the one or more of the ONUs, the respective branch power by splitting transmit optical power from the OLT according to the respective power splitting ratio associated with the respective second port of the distributive element for said one or more of the ONUs.

In an embodiment, the information relating to the respective branch power may comprise link attenuation of an individual or a group of the ONUs. In some embodiments, the distributive element may be controllable and may provide an asymmetrical splitting ratio distribution among the second ports of the distributive element. In this case, the method may further comprise adjusting a splitting ratio of one or more of the second ports of the distributive element.

In some embodiments, the adjusting of the respective branch power for the one or more of the ONUs may further comprise applying optical amplification to one or more of the second ports of the distributive element for the respective one or more of the ONUs and adjusting the respective optical amplification for the one or more of the ONUs. Additionally or alternatively, the adjusting of the respective branch power may further comprise adjusting a respective optical signal-to-noise ratio (OSNR) for the one or more of the ONUs. For example, in specific configurations such as cascaded amplified and adjustable splitter, the OSNR available at the output of the last cascade may be adjustable/controllable to a limited extent.

In some embodiments, the one or more optimization parameters may be associated with throughput maximization according to a bandwidth request from the plurality of ONUs, or green PON network system operation. These may include, among others, optical received power, net line rates, total system performance, low cost TRx, requests from the end points (e.g., premium customer), latency, up—and/or downstream traffic, and so on, based on a user and/or full system level. For example, in the green PON system operation, it is allowed to optimize the system for lower/minimum energy consumption, e.g., by disabling functions in the digital-signal-processing-based equalizers or FECs.

Configured as above, the use of controllable asymmetrical splitters enables a flexible adjustment of e.g., the SNR conditions for ONUs or group of ONUs and therefore can bring the PON flexibility to a next higher level. Besides, the proposed full-potential flexible-PON approach can be used to optimize throughput for each customer or customer groups. Additionally, the proposed solution can also be used to build up a "green" PON with lowest possible transmit powers to reduce the overall power consumption and total system costs.

Accordingly, a larger degree of flexibility, e.g., in terms of split ratio adaptations, inside the ODN can be effectively achieved by the method as proposed in the present disclosure, which is considered to be beneficial to join forces between the flexible-rate PON and the ODN deployment. In particular, the power splitters/combiners within the ODN can be dynamically or statically configured or reconfigured. In other words, with the proposed PON solution, the ODN becomes a controllable (manageable) part of the PON system and can be configured to conduct system optimization for the desired operation, such as maximum throughput. In this way, the adjustable ODN becomes also a part of the system parameters similar to e.g., the flexible-modulation or the flexible-FEC as in the flexible-rate PON system.

Another aspect of the disclosure relates to a system for managing traffic flow in a passive optical network (PON). The PON may comprise an optical line terminal (OLT) connected to a plurality of optical network units (ONUs) via an optical distribution network (ODN). The ODN may comprise a distributive element for distributing data carried by optical signals from the OLT to the individual ONUs or groups of ONUs. The distributive element may have a first port associated with signal transmission between the OLT and the ODN via a first optical link and a plurality of second ports each associated with signal transmission between the ODN and a respective ONU or a respective group of ONUs via a respective second optical link. Similar to the method as described above, any arbitrary number of distributive elements may be comprised in the ODN, for example, in a cascaded architecture, and each or any distributive element of any stage may have similar or the same capability.

In some embodiments, the ODN may comprises only one distributive element. The distributive element may have a first port connected to the OLT and a plurality of second ports each connected to a respective ONU or a respective group of ONUs. According to the disclosure, the system may comprise a system control means and a distribution control means. In particular, the system control means may be located at the OLT, and the distribution control means may be located at the distributive element.

Specifically, the OLT may be connected to the first port of the distributive element via a first optical link (e.g., a feeder fiber), and each of the ONUs may be connected to a respective second port of the distributive element via a respective second optical link (e.g., a distribution fiber). Besides, each of the second ports of the distributive element may be associated with a respective power distribution ratio of optical power at that second port relative to the optical power at the first port of the distributive element.

In particular, the system control means may comprise a PON control unit and an ODN control unit. The PON control unit may be configured to obtain one or more optimization parameters for a target state of the PON. As indicated above, the one or more optimization parameters may be obtained from the management system, and/or by obtaining requests from one or more of the ONUs. The PON control unit may be further configured to determine, for each of the ONUs, a respective modulation scheme for communicating data between the OLT and that ONU via the first optical link and the respective second optical link. Moreover, the ODN control unit may be configured to obtain the determined modulation schemes from the PON control unit, and then to determine the respective power distribution ratio for one or more of the ONUs based on the determined modulation schemes and the one or more optimization parameters.

Furthermore, the distribution control means may be configured to receive the determined respective power distribution ratio for the one or more of the ONUs. The distribution control means may be also configured to adjust a respective branch power for the one or more of the ONUs based on the determined power distribution ratio for communicating data between the OLT and the one or more of the ONUs. The proposed system may be configured to implement the proposed method(s) as indicated above.

Configured as above, the proposed system combines the flexible-rate PON with adjustable branch power in the ODN for the ONUs, thereby allowing net data rates to be configured or reconfigured to meet the customers' need.

In other words, the ODN (especially the branch power for the ONUs) of the proposed PON system can become a system parameter (i.e., as an input parameter fed back to the PON system) or a part thereof, which allows to dynamically assign bandwidth and traffic management to the individual end points, thereby achieving a fully flexible PON (full-potential flexible-PON approach). In this way, the full-potential flexible PON approach allows to enhance, for example, the maximum capacity for a given aggregated network request on the physical layer. Alternatively, both the ODN configuration and the PON system parameters may be set by a common management or orchestration layer. However, these options will not further be detailed here, In some embodiments, the PON control unit may be further configured to obtain the determined power distribution ratio from the ODN control unit and to determine the respective modulation schemes based on the determined power distribution ratio. In particular, the system control means may be configured to vary the respective modulation schemes and/or the respective power distribution ratio until the target state of the PON is reached.

In some embodiments, the PON control unit may be further configured to determine for each of the ONUs, a respective coding scheme and/or one or more respective forward error correction (FEC) parameters for communicating data between the OLT and that ONU. Besides, the PON control unit may be also configured to provide, to a Media Access Control, MAC, layer of the PON, the determined modulation schemes, the determined coding schemes, and/ or the determined FEC parameters for, e.g., physical-layer bandwidth allocations to the ONUs.

In some embodiments, the ODN control unit may be further configured to provide the determined power distribution ratio to the MAC layer of the PON for sending the determined power distribution ratio to the distribution control means for adjusting the respective branch power. The ODN control unit may be also configured to determine the respective power distribution ratio for the one or more ONUs based on the determined coding schemes and/or the determined FEC parameters. Accordingly, the proposed system performs an optimization procedure (e.g., by means of a real-time processing engine) which optimizes power, modulation, FEC as well as other parameter settings to allow dynamic adjustability of the PON system.

In some embodiments, the PON control unit may be further configured to obtain a bandwidth request from the plurality of ONUs, and may also configured to obtain one or more system parameters relating to a current state of the PON. In particular, the one or more system parameters may comprise information relating to the respective branch power for transmitting (communicating) data between the OLT and the respective ONU. Moreover, the PON control unit may be configured to also determine for each of the ONUs, the respective modulation scheme, coding scheme and/or one or more respective FEC parameters based on the bandwidth request from that ONU, the one or more system parameters, and the one or more optimization parameters.

Similar to the proposed methods above, the proposed system may also be applicable separately to both downlink and uplink communications in the PON. In some embodiments, the distributive element of the ODN within the PON may comprise an optical splitter for downstream traffic, and an optical combiner (multiplexer) for upstream traffic. In some embodiments, however, a downstream splitter may also act as a combiner for upstream as well. For example, the respective power distribution ratio may comprise a respective power splitting ratio associated with the respective second port of the distributive element. In this case, the distribution control means may be configured to, for providing the respective branch power, split transmitted optical power from the OLT according to the respective splitting ratio associated with that respective second port of the distributive element.

In some embodiments, the distributive element may be controllable by the distribution control means (configured to adjust a respective branch power for the one or more of the ONUs based on the determined power distribution ratio) and may be configured to further provide an asymmetrical splitting ratio distribution among the second ports of the distributive element. Besides, the distribution control means may then be further configured to adjust the splitting ratio of one or more of the second ports of the distributive element, and/or to adjust link attenuation for an individual or a group of the ONUs.

In some embodiments, the system may further comprise one or more optical amplifiers connected between the respective one or more of the second ports of the distributive element and the respective one or more of the ONUs. In this case, the optical amplifiers may be configured to determine power amplification for the respective one or more of the ONUs.

In some embodiments, the distribution control means may be configured to provide, for each of the ONUs, the respective branch power at the respective second port of the distributive element for communicating data between the OLT and that ONU via the first optical link and the respective second optical link, based on the respective power distribution ratio associated with the respective second port of the distributive element.

In some embodiments, the system control means may be further configured to determine a respective optical signal-to-noise ratio (OSNR) for one or more of the ONUs. In some embodiments, the one or more optimization parameters may be associated with throughput maximization according to a bandwidth request from the plurality of ONUs, or green PON network system operation, as for the above disclosed method(s). For example, in the green PON system operation, it is allowed to optimize the system for lower/minimum energy consumption, e.g., by disabling functions in the digital-signal-processing-based equalizers or FECs.

Configured as above, the ODN becomes an integral part of the PON system due to the use of variability of power splitters/combiners in the ODN. Accordingly, a larger degree of flexibility of the ODN for the full-potential flexible-PON system can be achieved, thereby enabling effective system optimization for the desired operation (e.g., maximum throughput based on the bandwidth request).

Notably, both the OLT and the ODN in the proposed PON are mutually controllable. Especially, the system control means (e.g., system control engine) at the OLT side is enabled to optimize the demand from customers or operators for a feature or a set of features (e.g., throughput, green operation, etc.), and to allocate the parameters for the proposed full-potential flexible-PON system. Besides, the output parameters (i.e., the PON system parameters) from the system control engine may include, amongst others, e.g., modulation formats, FEC, shaping/coding and the setting of the ODN power splitter/combiner (e.g., split ratio) for the individual ONUs or groups of ONUs. It is further noted that the control engine is applicable to downstream and upstream communications and requires exchange with the traffic manager and dynamic bandwidth allocation functionality.

Another aspect of the disclosure relates to an optical line terminal (OLT) for data communication with a plurality of optical network units (ONUs) in a passive optical network (PON) via an optical distribution network (ODN). The OLT may comprise a control interface configured to obtain one or more optimization parameters for a target state of the PON. The OLT may also comprise a PON control unit configured to determine one or more modulation schemes for communicating optical data between the OLT and one or more of the ONUs. The OLT may further comprise an ODN control unit configured to obtain the determined one or more modulation schemes from the PON control unit, and to determine, based on the determined one or more modulation schemes and the one or more optimization parameters, a respective power distribution ratio for the ODN for communicating the optical data with the one or more of the ONUs.

Another aspect of the disclosure relates to a distributive element for an optical distribution network (ODN) for data communication between an optical line terminal (OLT) and a plurality of optical network units (ONUs) in a passive optical network (PON). The distributive element may comprise a first port associated with signal transmission between the OLT and the ODN via a first optical link. The distributive element may also comprise a plurality of second ports each associated with signal transmission between the ODN and a respective ONU or a respective group of ONUs within the PON via a respective second optical link. Moreover, the distributive element may comprise a distribution control means configured to obtain, from the OLT, a respective power distribution ratio for each of the second ports, and to adjust a respective branch power for one or more of the ONUs based on the obtained respective power distribution ratio for communicating data between the OLT and the one or more of the ONUs.

It is further noted that the distribution control means (e.g., splitter control engine) at the ODN side is enabled to support dynamic power allocations (e.g., splitter allocation) to the ONUs, and to configure asymmetrical loss distributions for the power splitters/combiners.

In view of the above, the present disclosure proposes a promising and future looking approach that combines the flexible-rate PON approach with adjustable splitters/combiners inside the ODN to unlock flexible-rate PON for the full potential. This will allow to satisfy the service demand of customers, such as high throughput or low latency, or the desire of an operator for operational feature such as low power consumption. Thus, the proposed full-potential flexible-PON methods and systems show a disruptive approach for future optical access solutions which provides higher capacity and flexibility to meet the requirements of customers (e.g., in terms of bandwidth and power requests).

Implementations of the disclosed apparatus (e.g. the means for performing the above indicated steps/functions) may include using, but not limited to, one or more processor, one or more application specific integrated circuit (ASIC) and/or one or more field programmable gate array (FPGA). Implementations of the apparatus may also include using other conventional and/or customized hardware such as software programmable processors.

The above mentioned method steps and device features may be interchanged in many ways. In particular, the details of the disclosed devices can be implemented as a method, as understood by the skilled person.

BRIEF DESCRIPTION OF THE FIGURES

Embodiments of the disclosure are explained below in an exemplary manner with reference to the accompanying drawings, wherein FIGS. 1(*a*), 1(*b*) and 1(*c*) illustrate the evolution of PON solutions for different system generations;

FIG. 2(*b*) schematically illustrates an exemplary system control means within the OLT in a full-potential flexible PON according to embodiments of the disclosure;

FIG. 4(*b*) schematically illustrates an exemplary variable optical power splitter for implementation in an ODN of a full-potential flexible PON according to embodiments of the disclosure;

FIG. 7(*b*) schematically illustrates a classic flexible-rate PON with flexible PON system at the OLT but static ODN splitter configurations; and FIG. 7(*c*) schematically illustrates an exemplary architecture of a full-potential flexible PON according to embodiments of the disclosure.

DETAILED DESCRIPTION

Figure 1A:
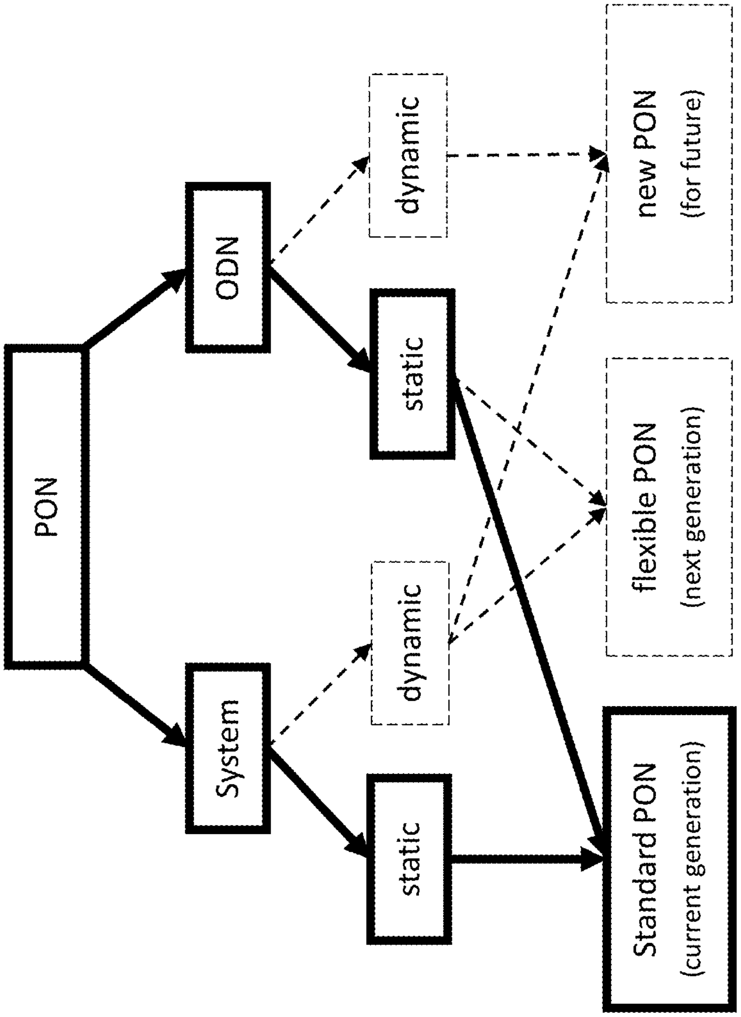
Figure 1B:
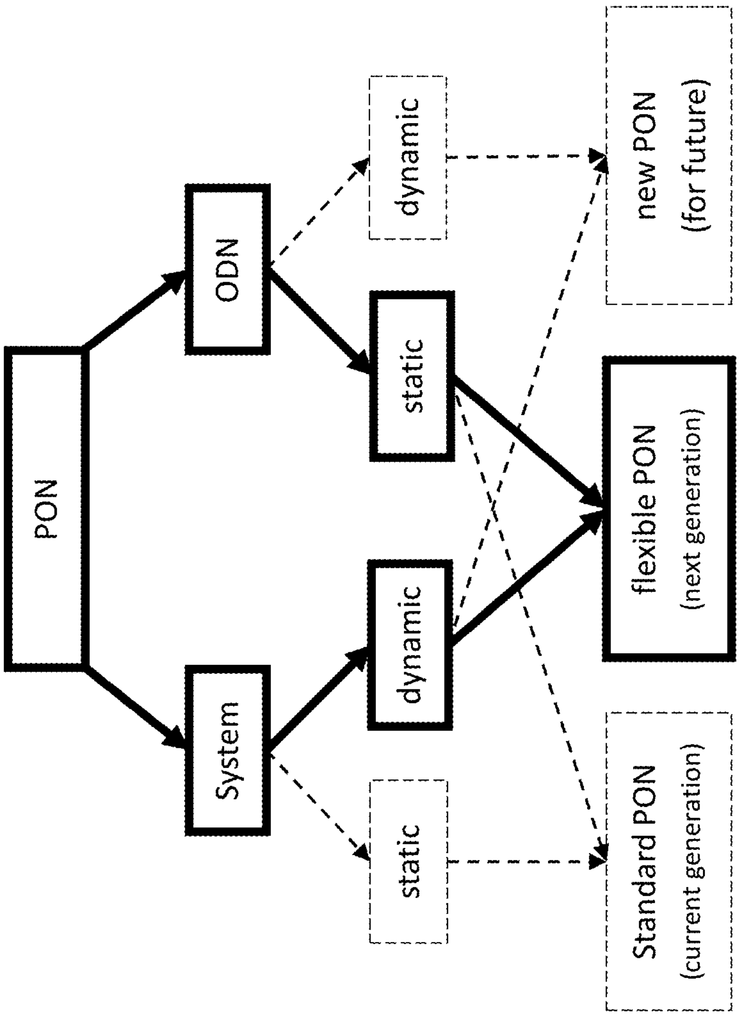
Figure 1C:
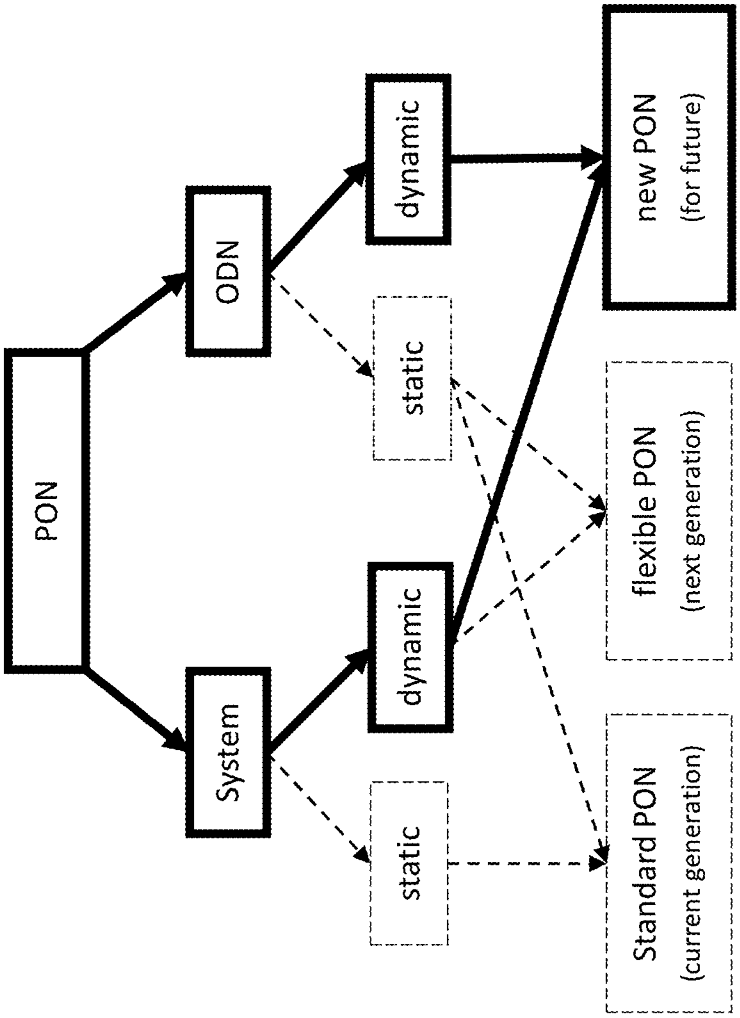

FIG. 1 illustrates the evolution of PON solutions for different system generations. FIG. 1(*a*) shows the standard PON solution where the system as well as the ODN is static (i.e., fixed line rates, fixed modulation formats and fixed ODN) and the overall system performance is limited by the ODN. FIG. 1(*b*) shows the flexible-rate PON approach where variable line rates, modulation formats and FEC rates are flexible up to the static (fixed) ODN limits. Within the standard PON solution where all ONUs are designed for a defined ODN attenuation range, most of the ONUs are far away from reaching the bandwidth limits and show still some margin. On the other hand, the flexible PON may use the available margin to increase net data rates by adjusting modulation formats and FEC code rates. However, far distant ONUs with bad power conditions will still not benefit by use of the flexible-rate PON solution. In the deployment of classic PON systems, ODN is fully passive and static.

Such PON systems need to cope with the limits given by the ODN attenuation, and the overall system is set up according to the ODN parameters which are defined and given during installation.

FIG. 1(*c*) shows the full-potential flexible PON approach where the line rates, modulation formats and ODN parameters are all variable to achieve a fully flexible PON. The ODN becomes a part of the system and can be configured to meet customers' needs. In particular, the ODN parameters also belong to system parameters and can be adjusted by use of flexible splitters/combiners, whenever it is required to dynamically or statically configure dedicated links and fulfill individual bandwidth requirements. To this end, adjustable splitters/combiners may be combined with the flexible-rate PON to overcome power limitations even for far distant ONUs and to enable fully configurable net data rates according to the customers' need. Bandwidth and traffic management can be dynamically assigned. The use of controllable asymmetrical splitters will enable a deterministic and flexible PON, and show a next level of flexibility. Additionally, this full-potential flexible PON approach can also be used to optimize bandwidth conditions for the individual customers, dependent on their personal needs, and further to build up a "green" PON allowing lowest possible transmit power for reduction of the overall power consumption/system costs.

Figure 2A:
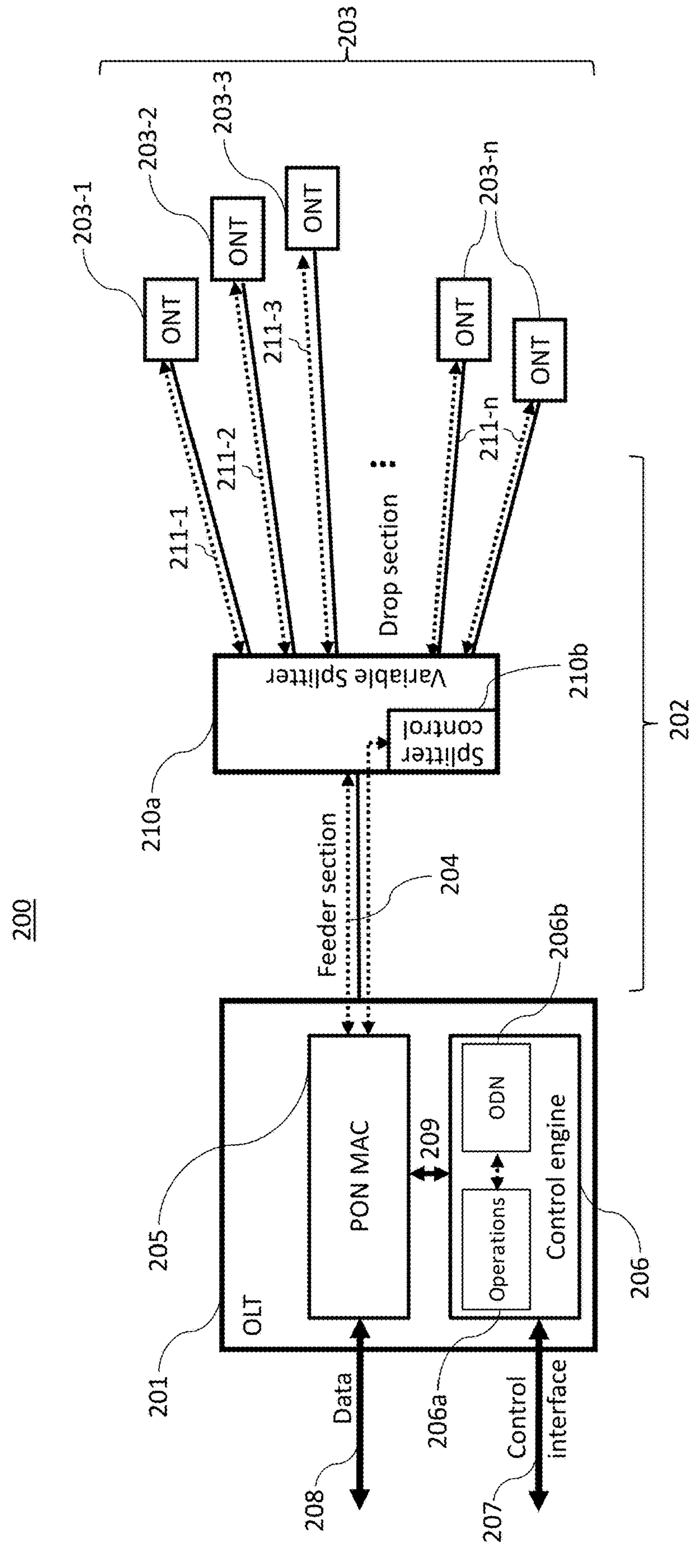
FIG. 2(*a*) schematically illustrates an exemplary architecture of a full-potential flexible passive optical network (PON) according to embodiments of the disclosure.
Figure 2B:
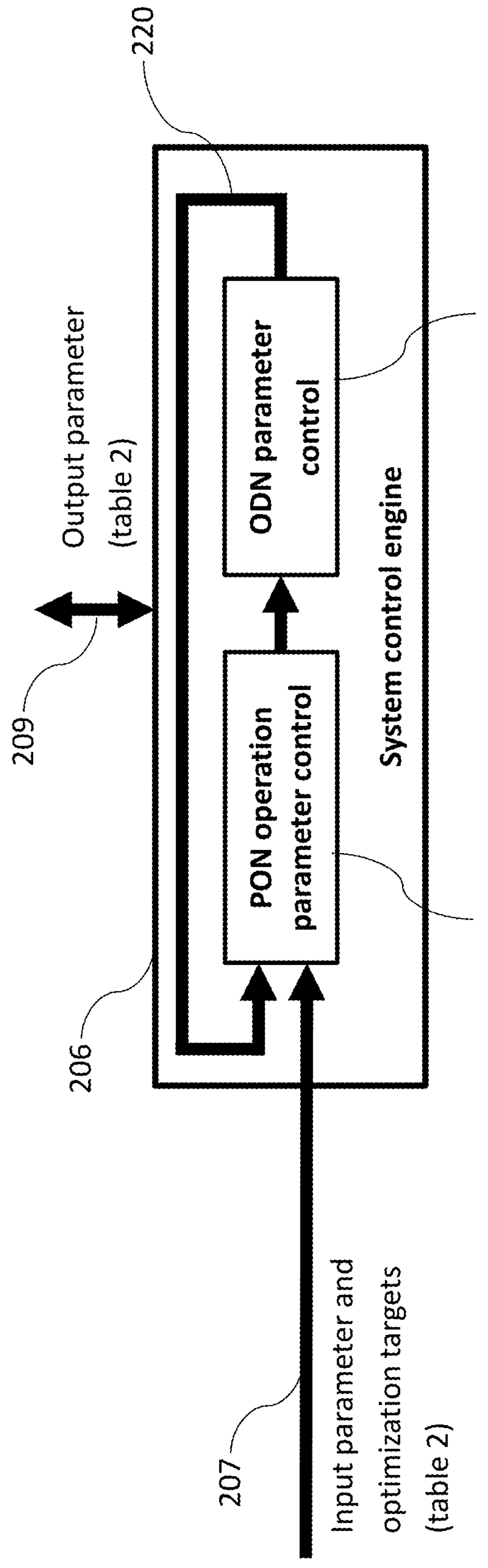

FIG. 2(*a*) schematically illustrates an exemplary architecture of a full-potential flexible passive optical network (PON) according to embodiments of the disclosure. The PON 200 comprises an optical line terminal (OLT) 201 located at a central office (CO) and one or more optical network terminals (ONTs) 203 connected each other via an optical distribution network (ODN) 202. The ODN 202 can distribute data (e.g., received via the data interface 208) carried by optical signals from the OLT 201 to the individual ONUs or groups of ONUs 203 using a distributive element in the form of an optical splitter/combiner 210 (depending on whether the traffic is related to a downstream link or an upstream link), which has a first port connected to the OLT 201 and a plurality of second ports each connected to a respective ONU or a respective group of ONUs 203.

Specifically, the ODN 202 has a tree-and-branch architecture and thereto comprises an optical feeder fiber 204, a passive 1: n splitter/multiplexer (or combiner) 210, and n optical distribution fibers or drop fibers 211-1, 211-2, 211-3, . . . , 211-*n* that connect the passive optical splitter/multiplexer 210 to respective ones of the ONUs 203-1, 203-2, . . . , 203-*n*. The optical feeder fiber 204 connects the OLT 201 to the first port of the passive splitter/multiplexer 210, and each of the optical distribution fibers 211 connects the respective second ports of the passive splitter/multiplexer 210 to a respective ONU or a respective group of ONUs 203. According to some examples, the central office may host multiple OLTs, similar to OLT 201. The feeder fiber 204 is shared for downstream transmissions towards multiple ONUs 203 and upstream transmissions from multiple ONUs 203.

Generally, to avoid collisions between the n users sharing the PON, a time-division multiplexing (TDM) protocol is used in downstream direction and a time-division multiple access (TDMA) protocol is used in upstream direction. The ONUs 203-1, 203-2, . . . , 203-*n* in other words receive data in different time intervals and transmit data in different time intervals assigned to them. The upstream time intervals assigned to the ONUs 203 may have equal or different lengths (timeslots). Moreover, it may also be possible to use wavelength division multiplexing (WDM) for separate communications with the individual ONUs 203 that will then receive/transmit data carried by optical signals at different wavelengths. It is further noted that, although the illustrated system of FIG. 2(*a*) includes one distributive element, as mentioned above, more than one and any number of distributive elements may be applicable, for example, in a cascaded architecture and are within the scope of present implementations.

In the embodiment, the OLT 201 comprises a system control means (such as a control engine) 206, and the passive optical splitter/multiplexer 210 (as the distributive element) comprises a distribution control means (such as a splitter control engine) 210*b* working together with a controllable (variable) splitter/multiplexer 210*a*. It is further noted that each of the second ports of the optical splitter/multiplexer 210 may be associated with a respective power distribution ratio of optical power at that second port to optical power at the first port of the optical splitter/multiplexer 210.

In particular, the system control means 206 comprises a PON control unit 206*a* and an ODN control unit 206*b*. The PON control unit 206*a* is configured to obtain, via e.g., a control interface 207, one or more optimization parameters for a target state of the PON 200. The target state may indicate, for example, parameters and/or performance of the system (such as line rates, up/down-stream traffic and latency, etc.) at which the PON shall operate/reach according to customers' requests and deployment requirements/conditions. These optimization targets may be determined or pre-configured at a user and/or system level. The PON control unit 206*a* is further configured to determine, for each of the ONUs 203, a respective modulation scheme (and optionally a respective coding scheme and/or one or more respective FEC parameters) for communicating data between the OLT 201 and that ONU 203 via the feeder fiber 204 and the respective distribution fiber 211.

Moreover, the ODN control unit 206*b* is configured to obtain the determined modulation schemes (and optionally the determined respective coding scheme and/or the one or more determined respective FEC parameters) from the PON control unit 206*a*, and then to determine the respective power distribution ratio for one or more of the ONUs 203 based on the determined modulation schemes (and optionally the determined respective coding scheme and/or FEC parameter(s)) together with the one or more optimization parameters.

As indicated above, the distribution control means 210*b* is configured to receive or obtain the determined respective power distribution ratio for the one or more of the ONUs 203. The distribution control means 210*b* is also configured to adjust a respective branch power for the one or more of the ONUs 203 based on the determined power distribution ratio for communicating data between the OLT 201 and the one or more of the ONUs 203. Besides, the PON control unit 206*a* is also configured to provide, to a MAC layer 205 of the PON, the determined modulation schemes, the determined coding schemes, and/or the determined FEC parameters (e.g., the FEC settings) for bandwidth allocations at the physical layer to the ONUs 203. Also, the ODN control unit 206*b* is further configured to provide the determined power distribution ratio to the MAC layer 205 of the PON for sending the determined power distribution ratio to the distribution control means 210*b* for adjusting the respective branch power. The power distribution ratio, the modulation schemes (formats), the coding schemes, and/or the FEC parameters (the FEC settings) are provided from the control engine 206 to the MAC layer 205 via an internal communication 209.

It is noted that the optical splitter/multiplexer 210*a* inside the ODN can be controlled and adjusted remotely from the control engine 206 at the OLT side. For example, in the downstream direction, the different splitter ports can be adjusted in attenuation and tuned to enable the required power conditions for a given port or ONU 203.

FIG. 2(*b*) schematically illustrates an exemplary system control means within the OLT in a full-potential flexible PON according to embodiments of the disclosure. It is noted that FIG. 2(*b*) depicts a detailed view of the system control engine 206 of the OLT 201 as shown in FIG. 2(*a*), which contains similar entities with the same reference numbers performing the same or similar functions as in FIG. 2(*a*). It is to be emphasized that the system control means (system control engine) 206 is configured to receive/obtain, via the control interface 207, the optimization targets and input parameters as shown in Table 1, The input parameters may include, among others, a bandwidth request from the plurality of ONUs 203 and one or more system parameters relating to a current state of the PON 200.

As further shown in Table 1, the output parameters from the system control engine 206 include, among others, the determined power distribution ratios (e.g., the calculated splitter ratio), modulation formats, coding/shaping (such as NRZ or RZ shaping formats), and/or the FEC settings/parameters, which are to be provided to the MAC layer 205 via an internal communication 209. As indicated above, the power distribution ratios are determined by the ODN control unit 206*b*, and the modulation formats, coding/shaping and the FEC settings are determined by the PON control unit 206*a*. It is noted that the determined power distribution ratios will be obtained by the PON control unit 206*a*, via a feedback path 220 (from the ODN control unit 206*b* to the PON control unit 206*a*), which will then again determine the respective modulation schemes (and optionally the respective coding scheme and/or one or more respective FEC parameters) based on the determined power distribution ratio. In other words, the system control engine 206 is configured to vary the respective modulation schemes (and optionally the respective coding scheme and/or one or more respective FEC parameters) and/or the respective power distribution ratio until the target state of the PON is reached.

It is noted that variable splitter devices are introduced inside the ODN to enable the full-potential flexible-PON system. These variable power splitters work with a system control engine (e.g., the system control means 206) that takes care on the holistic PON operation and ODN parameters, i.e., allocation of power on different point-to-multipoint arms as well as allocation of flexible modulation and flexible FEC to various ONUs or ONU groups. As illustrated in FIG. 2, the system control engine 206 comprises a PON operations control 206*a* and an ODN operations control 206*b*. The PON operation parameter control 206*a* takes into account a set of input parameters from the ODN and customers/services as well as the optimization targets. The optimization targets may include, e.g., throughput maximization, or greener PON network system operation, and so on. It is further noted that the parameters listed in Table 1 are purely exemplary and are non-exhaustive. Other possible parameters may be also taken into account for the system optimization.

According to these input parameters and optimization target requests, a decision on the flexible-rate PON allocation per ONU or per group of ONU can be performed assuming the current state of the ODN power allocation (e.g., power splitting allocation for the downstream link). The determined flexible-rate PON allocation is then forwarded to the ODN control engine 206*b* that analyses the new allocation with the desired optimization targets and provides feedback 220 to the PON operation control 206*a*. In an iterative feedback loop the optimum set of parameters are targeted. Such optimization process may be implemented by e.g., machine learning algorithms (which may be run by, for example, a real-time processing engine). The proposed system thus performs an optimization procedure (e.g., by means of a real-time processing engine). Subsequently, the system control engine 206 provides a set of determined output parameters (e.g., as shown in Table 1) via feedback 209 to the PON MAC 205 that can instruct the PON hardware to perform the allocations. For example, power, modulation, FEC as well as other parameter settings are to be optimized to allow dynamic adjustability of the PON system.

TABLE 1

Exemplary input- and output parameters of the system control engine and possible optimization levels

| Input parameter to system control engine | Possible optimization targets, e.g.,: | Output parameters for full-potential flexible-PON |
|---|---|---|
| Optical power from all TRx<br>Customer request for BW<br>Current system parameter<br>BER<br>FEC<br>Coding | Optical received power<br>Net line rate<br>Total system performance<br>Low cost TRx<br>Premium customer<br>Latency<br>Up- and/or downstream traffic<br>On a user and/or full system level | Calculated splitter ratio<br>New system parameter<br>FEC settings<br>Modulation Format<br>Coding/Shaping |

Accordingly, compared with the current classic PON solutions, in the proposed full-potential flexible-PON system, the ODN becomes an integral part of the system allocation functionality. For example, the splitting ratio of the ODN becomes an output parameter and thus can be used to optimize the overall system performance.

Figure 3:
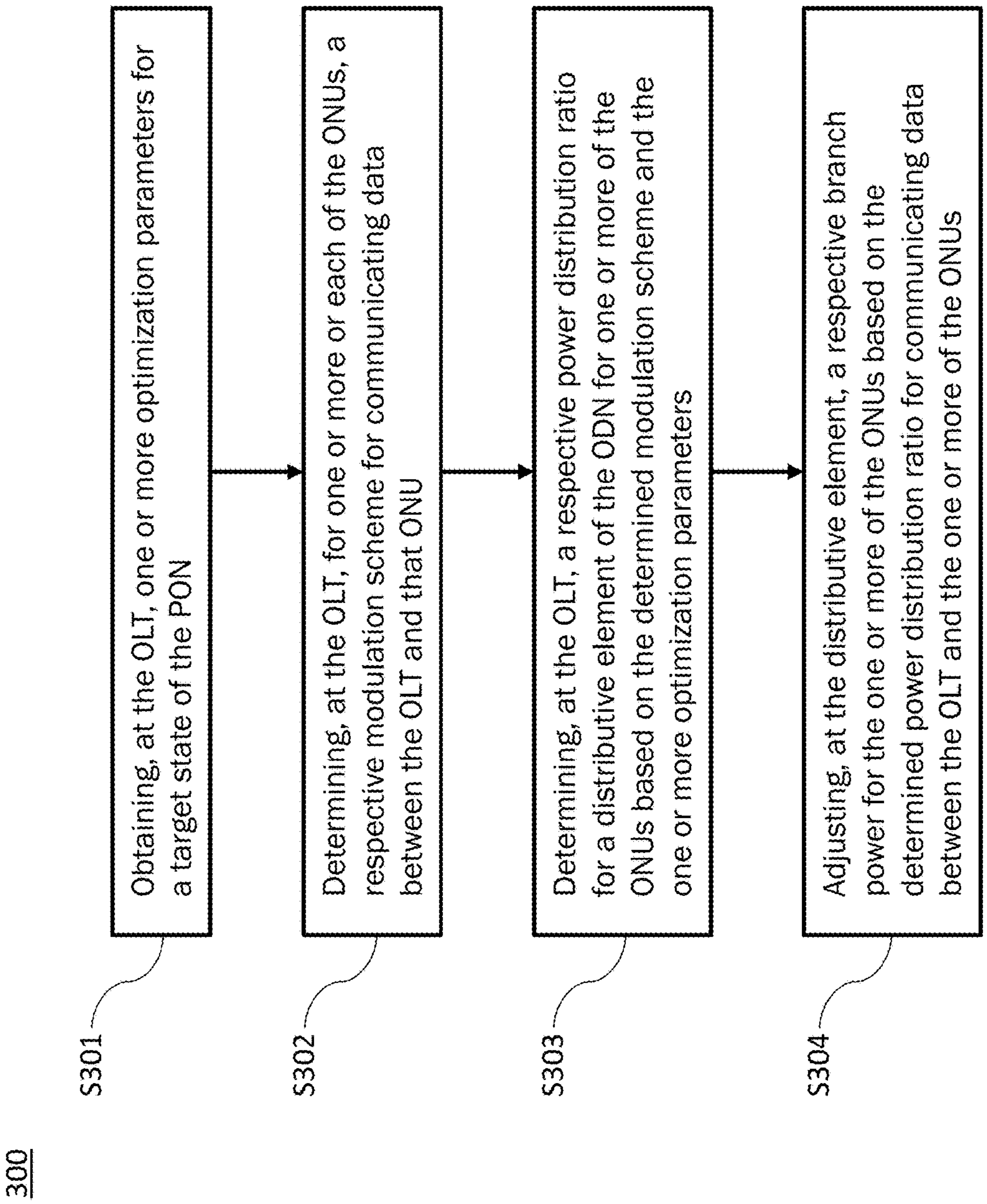
FIG. 3 illustrates a method for managing traffic flow in a passive optical network (PON) according to embodiments of the disclosure.

FIG. 3 illustrates a method for managing traffic flow in a passive optical network (PON) according to embodiments of the disclosure. The method 300 can be implemented by, for example, the PON system 200 as illustrated in FIG. 2(*a*), and the processing steps of the method 300 may be carried out by the different subsystems or means/units within the PON system 200 including the OLT 201, the ONUs 203 and the ODN 202.

Specifically, the method 300 comprises obtaining (step 301), at the OLT, one or more optimization parameters for a target state of the PON. The method 300 comprises determining (step 302), at the OLT, for one or more or each of the ONUs, a respective modulation scheme for communicating data between the OLT and that ONU. The method 300 also comprises determining (step 303), at the OLT, a respective power distribution ratio for a distributive element of the ODN for one or more of the ONUs based on the determined modulation scheme and the one or more optimization parameters. As indicated above, the distributive element has a first port connected to the OLT and a plurality of second ports each connected to a respective ONU or a respective group of ONUs. Besides, each of the second ports of the distributive element is associated with a power distribution ratio of optical power at that second port to optical power at the first port of the distributive element. The method 300 further comprises adjusting (step 304), at the distributive element, a respective branch power for the one or more of the ONUs based on the determined power distribution ratio for communicating data between the OLT and the one or more of the ONUs.

Figure 4B:
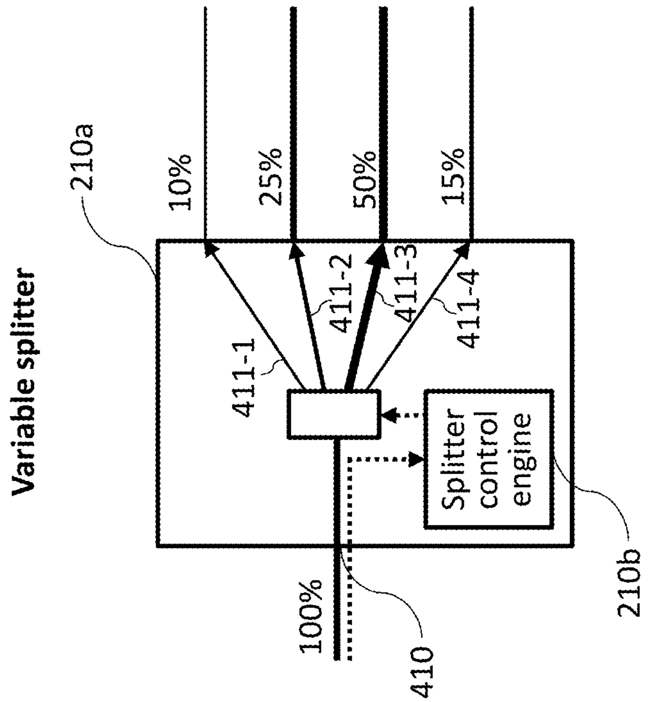
FIG. 4(*a*) schematically illustrates an example of a conventional four-port optical power splitter to be implemented in an ODN of a PON.
Figure 4A:
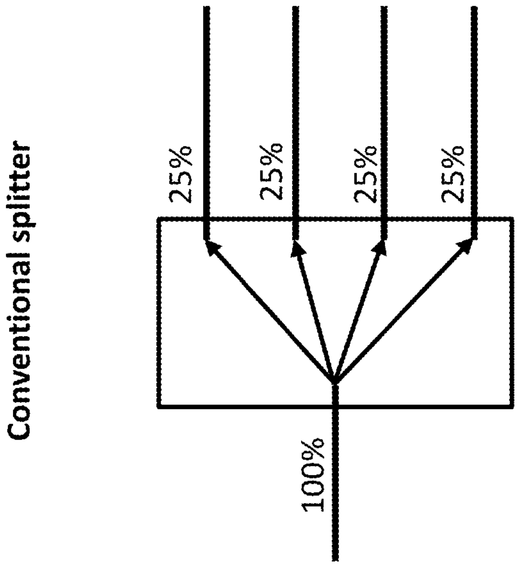

FIG. 4(*a*) schematically illustrates an example of a conventional four-port optical power splitter to be implemented in an ODN of a PON. In contrast, FIG. 4(*b*) schematically illustrates an exemplary variable optical power splitter for implementation in an ODN of a full-potential flexible PON according to embodiments of the disclosure. For example, the variable optical power splitter may be implemented (as the distributive element) in the PON system 200 as shown in FIG. 2(*a*).

In the embodiment of FIG. 4(*b*), the variable optical power splitter is controllable by the splitter control engine (i.e., the distribution control means) 210*b* and is configured to further provide an asymmetrical splitting ratio distribution among the distributive ports (i.e., second ports) 411-1, 411-2, 411-3, 411-4 of the variable optical power splitter. In some examples, the splitter control engine 210*b* may be further configured to adjust the loss/attenuation of one or more of the distributive ports (second ports) 411 of the variable optical power splitter, so as to achieve the asymmetrical splitting ratio distribution (i.e., asymmetrical power distribution ratios) among the distributive ports 411.

For example, the power distribution ratio can be 10% for the port 411-1, 25% for the port 411-2, 50% for the port 411-3 and 15% for the port 411-4. The distribution of the power ratios may be dependent on the requirements for data transmission and/or the user request for the individual ONUs (or group of ONUs). For example, the ONU associated with the port 411-3 may be provided with larger portion (e.g., 50% of the power from the first port 410 connected to the OLT) of the optical power because of its location which is farther away from the OLT compared to the other ONUs. The control engine 210*b* inside the variable splitter is used to adjust the different splitter ports to the requested levels.

In contrast, the conventional power splitter as shown in FIG. 4(*a*) divides the optical power equally to the distributive ports. Namely, each of the four distributive ports is assigned with 25% of the optical power at the first port 410 connected to the OLT, regardless of the status for data transmission or the user request for the individual ONUs. Thus, in case of the conventional splitter, all ports show uniform levels (e.g. 25% for a four port device).

Accordingly, inside the ODN, variable and controllable splitters from the OLT (or ONU) side are used to enable a flexible ODN. Different implementations of adjustable splitters known in the art may be applicable to the ODN within the full-potential flexible PON, such as implementation of a fusion coupler where change in strain to the splitter enables changed coupling ratio, and implementation of a splitter using Mach-Zehnder Interferometer assembly by selection of coupling ratio based on phase manipulation.

In the proposed PON system 200 shown in FIG. 2(*a*), a communication path from the system control engine 206 to the splitter control engine 210*b* inside the splitter may be established to adjust the dedicated splitter ratio (or loss) for each port. It should be noted that, the variable splitter of FIG. 4(*b*) having four distributive ports is purely exemplary and that other variable splitters having different numbers of distributive ports may be also applicable to the proposed full-potential flexible-PON system 200. It is further noted that multiple splitter stages (apart from the single stage as shown in the embodiment of FIG. 2(*a*) and FIG. 4(*b*)) can also be implemented. In the embodiment of FIG. 4(*b*), it is the variable splitter that serves as the distributive element for the downstream link, whereas the similar configuration can also be applied to a combiner/multiplexer for the upstream link.

It is noted that different percentages can be adjusted for the variable splitter to provide an asymmetrical splitting ratio (or loss) distribution. Normally the total percentage does not exceed 100%. However, it is also possible to alternatively combine the power splitting function with optical amplification for the ODN to increase the power allocation flexibility which would achieve higher total power larger than the input power (i.e., become >>100% compared to the power at the input port 410). For example, the splitter may be augmented by means of an optical amplification engine (e.g., semiconductor optical amplifiers) . It is further noted that the system control engine 206 may also determine a respective optical signal-to-noise ratio (OSNR) for one or more of the ONUs, for example, by adjusting the respective power splitting ratio and/or the respective amplification, as in specific configurations with cascaded amplified and adjustable splitter where the OSNR available at the output of the last cascade is OSNR adjustable/controllable to limited extent.

Figures 5A, 5B:
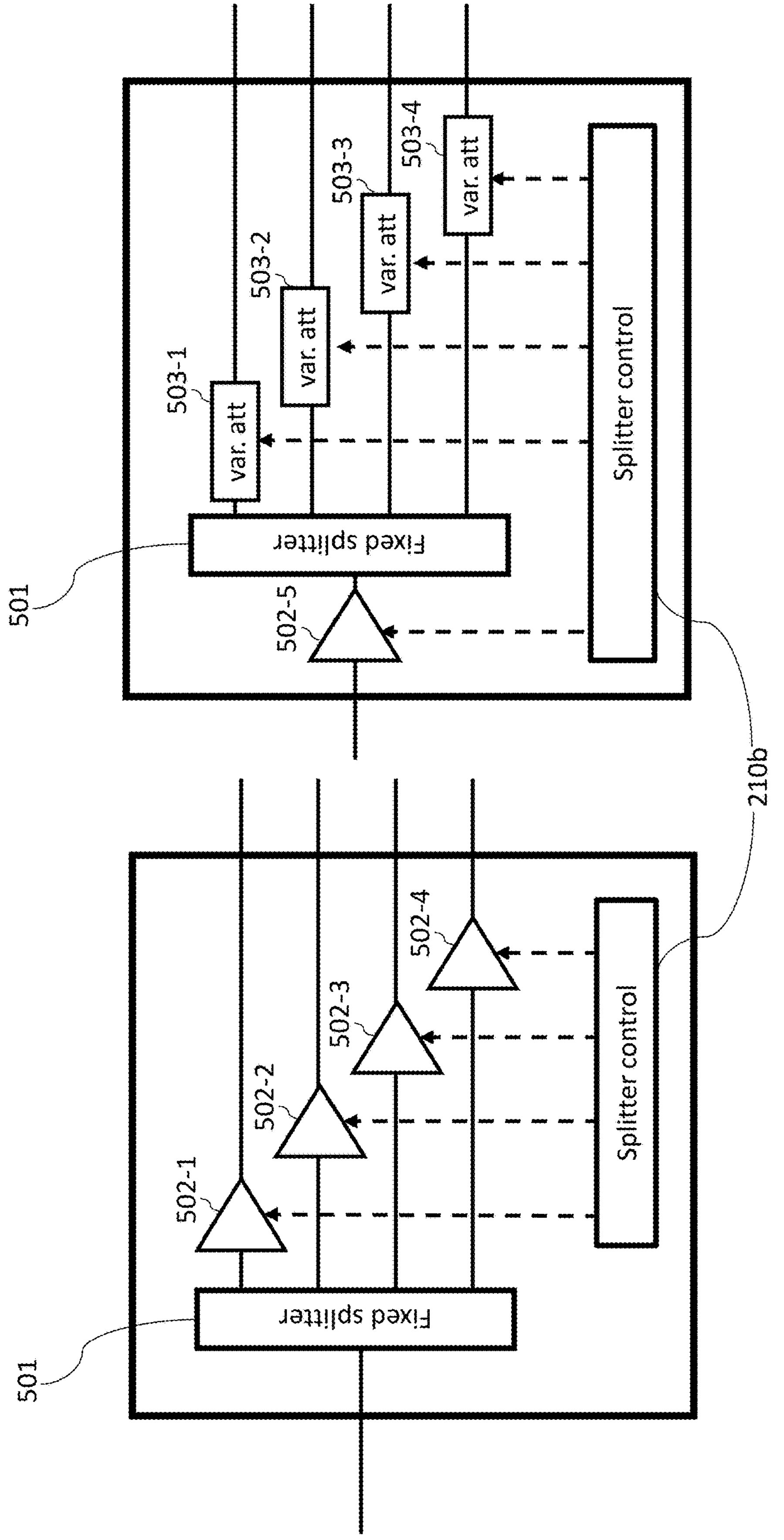
FIG. 5 schematically illustrates exemplary implementations of the distributive element in an amplification configuration (FIG. 5(*a*)) and in an attenuation configuration (FIG. 5(*b*)) according to embodiments of the disclosure.

FIG. 5 schematically illustrates still possible exemplary implementations of the distributive element according to embodiments of the disclosure, which is to serve as a variable/adjustable power splitter. Herein, a combined use of a fixed splitter 501 with one or more optical amplifiers 502 and/or attenuators 503 is shown in FIG. 5(*a*) and FIG. 5(*b*), where the amplifier(s) 502-1, 502-2, . . . , 502-5 and the attenuator(s) 503-1, . . . , 503-4 may be variable, or adjustable (controllable) by the splitter control engine 210*b*, which can be implemented by use of optical FPGA, for example. Again, the distributive element of FIG. 5 having four distributive ports is purely exemplary and that other variable splitters having different numbers of distributive ports may be also applicable with a modified number of optical amplifiers and optical attenuators corresponding to the number of distributive ports and are within the scope of present implementations.

Specifically, the one or more optical amplifiers 502 may be placed between the respective distributive ports (e.g., ports 411) of the distributive element and the respective one or more of the ONUs (e.g., ONUs 203), as shown in FIG. 5(*a*). Alternatively, the one or more optical amplifiers 502 may be placed between the input first port (e.g., port 410) of the distributive element and the OLT (e.g., OLT 201), as shown in FIG. 5(*b*). Additionally, the one or more optical attenuators 503 may be likewise placed between the respective distributive ports (e.g., ports 411) of the distributive element and the respective one or more of the ONUs (e.g., ONUs 203), as shown in FIG. 5(*b*). For these configurations, an optical amplification/attenuation control engine may be additionally introduced or incorporated into the splitter control engine 210*b* to determine power amplification/attenuation of the one or more optical amplifiers/attenuators for the respective one or more of the ONUs. Accordingly, the ODN becomes a system variable and is used to drive the service demand of customers and services to enhance the degree of flexibility for the PON. In particular, the system control engine 206 includes the ODN controller 206*b* for dynamic adjustment of dynamic bandwidth allocations (at the physical layer) and/or traffic management, and for effective bandwidth allocation/scheduling/timing (short-term/long-term) in the full-potential flexible PON. Also, the splitter control engine 210*b* supports for dynamical splitters to further configure asymmetrical splitting ratio (loss) distributions.

Figure 6A:
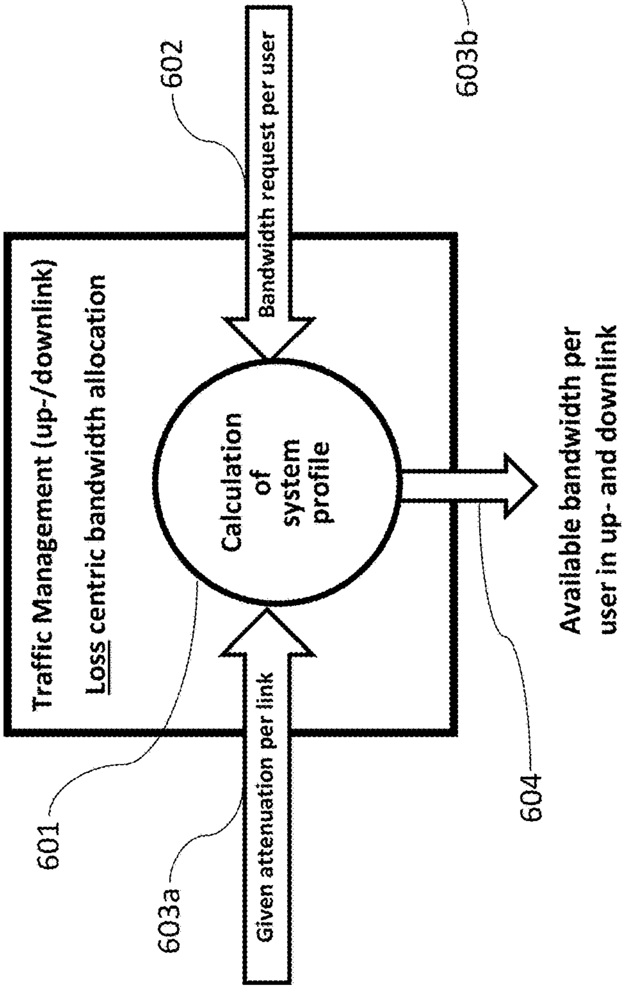
FIG. 6 illustrates a comparison of traffic management for classic/flexible PON (FIG. 6(*a*)) and the proposed full-potential flexible PON (FIG. 6(*b*))
Figure 6B:
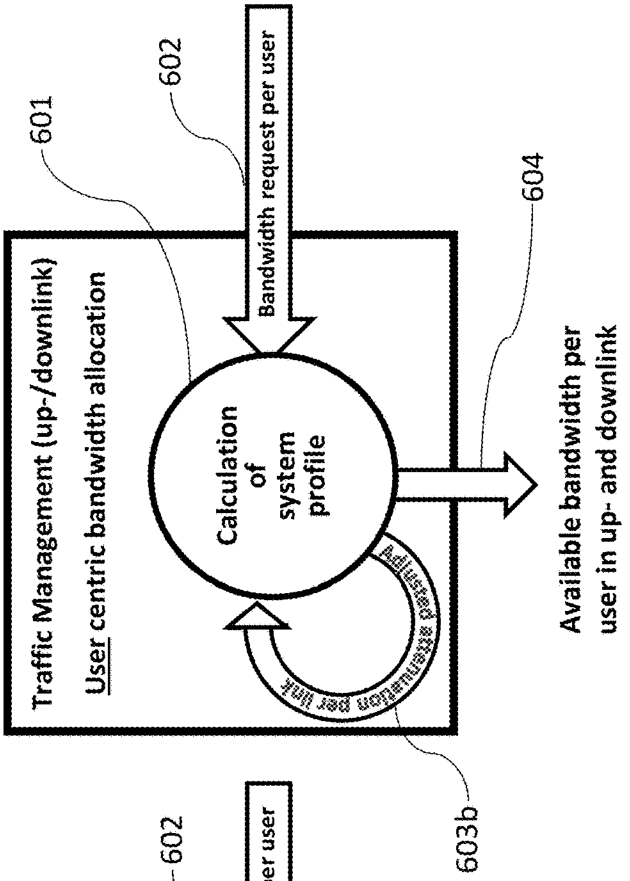

FIG. 6 illustrates a comparison of traffic management for classic/flexible PON (FIG. 6(*a*)) and the proposed full-potential flexible PON (FIG. 6(*b*)). For the classic (static) or flexible-rate PON system, the capacity that can be allocated on the physical layer for the ONU or group of ONUs is dictated by the given ODN link attenuation. As shown in FIG. 6(*a*), the management or allocation of resources for flexible-modulation and flexible-FEC as well as flexible probabilistic shaping (another pillar of flexible-rate PON) to the individual ONU or ONU groups has to be calculated (i.e., calculation of system profile as indicated by 601) taking into account these link attenuation (indicated by 603*a*) and the bandwidth request per user (indicated by 602) with the result of a so-called system profile for available bandwidth per user in up—and downlink (indicated by 604). This processing is considered to be loss centric.

In contrast, as shown in FIG. 6(*b*), the calculation of a system profile 601 changes and can leverage its full potential. The link attenuation of individual ONU or group of ONUs becomes a flexible input parameter (indicated by 603*b*) that can be modified together with the flexible-modulation, flexible-FEC and flexible-shaping to address the bandwidth request of the users (indicated by 602). Thus, it can increase the system flexibility up to e.g., the maximum capacity for a given aggregated network request on the physical layer. In this way, the bandwidth allocation scheme of the PON evolves from the loss centric (as illustrated in FIG. 6(*a*)) to a user centric method (as illustrated in FIG. 6(*b*)). As indicated above, the ODN changes from pure passive and static to a controllable part of the PON system and becomes an integral part of the system.

Figures 7A, 7B, 7C:
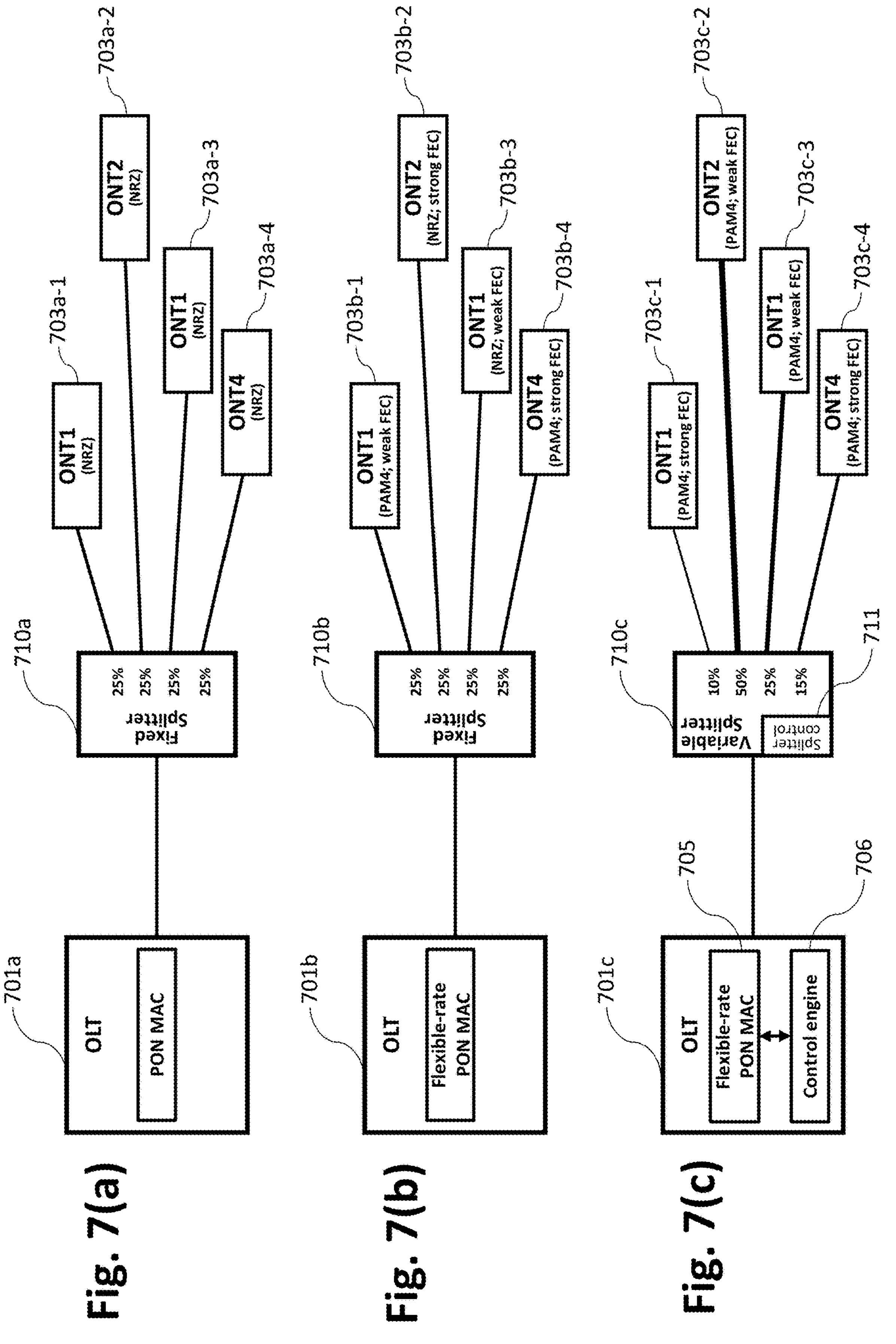
FIG. 7(*a*) schematically illustrates a conventional static PON with static ODN splitter configurations as well as static PON system net rates on the physical layer.

FIG. 7(*a*) schematically illustrates a conventional static PON with static ODN splitter configurations as well as static PON system net rates on the physical layer. Herein, the OLT 701*a* and the splitter 710*a* of the ODN are both static/fixed to provide fixed line rates to the individual ONUs 703*a*. It is explicitly shown that the splitter 710*a* has equally distributed power ratios for the ONUs, namely, 25% of the input power for each ONUs, to support data transmission using the same modulation format (i.e., the non-return-to-zero NRZ format) for all the ONUs, regardless of the requirements/conditions of the end points.

FIG. 7(*b*) schematically illustrates a classic flexible-rate PON with flexible PON system at the OLT but static ODN splitter configurations. Herein, the OLT 701*b* provides variable net line rates for the ONUs 703*b*, while the splitter 710*b* of the ODN is static/fixed providing fixed branch power for the individual ONUs 703*b*. Similar to the splitter 710*a* in the system of FIG. 7(*a*), the splitter 710*b* also has equally distributed power ratios for the ONUs, namely, 25% of the input power for each ONUs, to support data transmission while using different modulation formats for the individual ONUs, depending on the link conditions and/or request from the end points.

For example, for a closer ONU such as ONU 703*b*-1 which may still receive sufficient power, a higher-level modulation format (optionally together with weak FEC of lower code rates) may be employed. On the other hand, for a faraway ONU such as ONU 703*b*-2 which receives lower optical power due to the distance, a rather simple modulation format like NRZ (optionally together with strong FEC of higher code rates) shall be applied, in order to achieve a better throughput while keeping a detectable signal quality.

FIG. 7(*c*) schematically illustrates an exemplary architecture of a full-potential flexible PON according to embodiments of the disclosure. Herein, the OLT 701*c* provides variable net line rates for the ONUs 703*c*, and the splitter 710*c* of the ODN is variable and adjustable/controllable by the OLT 701*c* through the splitter control engine 711 to provide various branch power for the individual ONUs 703*c*. It is noted that nonuniformly distributed power ratios at the variable splitter 710*c* as well as various modulation formats and/or FEC settings determined by the control engine 706 are provided for the ONUs 703*c* depending on the system link conditions and/or request from the end points.

For example, according to the individual distance to the OLT, a closer ONU 703*c*-1 can be assigned with a lower power distribution ratio of 10%, while a faraway ONU 703*c*-2 can be assigned with a higher power distribution ratio of 50%. In this way, it is ensured that the faraway ONU 703*c*-2 can still receive sufficient power, so that a higher-level modulation format such as Pulse-Amplitude-Modulation 4 (PAM4) can still be applied for communication with the ONU 703*c*-2 (and perhaps also sufficient with weak FEC of lower code rates). On the other hand, since less power is allocated to the closer ONU 703*c*-1, strong FEC with higher code rates may be employed for the ONU 703*c*-1 to ensure the signal detectability when applying higher-order modulation formats (e.g., PAM4).

Accordingly, the proposed full-potential flexible PON allows the variation of system (modulation, FEC, shaping, etc.) and ODN parameters (e.g., power splitting ratios) to achieve throughput maximization within the PON based on customers' needs (in terms of required power, bandwidth request, and so on).

As used in this application, the term "means" may refer to one or more or all of the following: (a) hardware-only circuit implementations such as implementations in only analog and/or digital circuitry and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of means applies to all uses of this term in this application, including in any claims. As a further example, as used in this application, the term means also covers an implementation of merely a hardware circuit or processor (or multiple processors) or portion of a hardware circuit or processor and its (or their) accompanying software and/or firmware. The term means also covers, for example and if applicable to the particular claim element, a baseband integrated circuit or processor integrated circuit for a mobile device or a similar integrated circuit in a server, a cellular network device, or other computing or network device.

It should be noted that the device features described above correspond to respective method features that may be however not explicitly described, for reasons of conciseness. The disclosure of the present document is considered to extend also to such method features.

It should be further noted that the description and drawings merely illustrate the principles of the proposed device. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed device. Furthermore, all statements herein providing principles, aspects, and embodiments of the invention, as well as specific examples thereof, are intended to encompass equivalents thereof.

The invention claimed is:

1. A method for managing traffic flow in a passive optical network, PON, the PON connecting an optical line terminal, OLT, to a plurality of optical network units, ONUs, via an optical distribution network, ODN, the method comprising:

obtaining, at the OLT, one or more optimization parameters for a target state of the PON;

determining, at the OLT, for one or more or each of the ONUs, a respective modulation scheme for communicating data between the OLT and that ONU;

determining, at the OLT, a respective power distribution ratio for a distributive element of the ODN for one or more of the ONUs based on the determined modulation scheme and the one or more optimization parameters, the distributive element having a first port and a plurality of second ports, the first port associated with signal transmission between the OLT and the ODN, and each second port associated with signal transmission between the ODN and a respective ONU or a respective group of ONUs, wherein each of the second ports of the distributive element is associated with a power distribution ratio of optical power at that second port to optical power at the first port of the distributive element; and adjusting, at the distributive element, a respective branch power for the one or more of the ONUs based on the determined power distribution ratio for communicating data between the OLT and the one or more of the ONUs.

2. The method of claim 1, further comprising determining the respective modulation schemes based on the determined power distribution ratio and varying the respective modulation schemes and/or the respective power distribution ratio until the target state of the PON is reached.

3. The method of claim 1, further comprising:
determining, at the OLT, for each of the ONUs, a respective coding scheme and/or one or more respective forward error correction, FEC, parameters for communicating data between the OLT and that ONU;
providing, at the OLT, the determined modulation schemes, the determined coding schemes, and/or the determined FEC parameters to the ONUs; and
sending, from the OLT, the determined power distribution ratio to the distributive element of the ODN for the adjusting of the respective branch power.

4. The method of claim 3, further comprising determining, at the OLT, the respective power distribution ratio for the one or more ONUs based on the determined coding schemes and/or the determined FEC parameters.

5. The method of claim 3, further comprising:
obtaining, at the OLT, a bandwidth request from the plurality of ONUs;
obtaining, at the OLT, one or more system parameters relating to a current state of the PON, the one or more system parameters comprising information relating to the respective branch power for communicating data between the OLT and the respective ONU; and
determining, for each of the ONUs, the respective modulation scheme, coding scheme and/or one or more respective FEC parameters based on the bandwidth request from that ONU, the one or more system parameters, and the one or more optimization parameters.

6. The method of claim 5, wherein the one or more system parameters comprise one or more of:
optical power from a transceiver of an ONU and/or of the OLT,
a system bit error rate;
one or more FEC parameters for a transceiver of an ONU and/or of the OLT; and
a coding scheme of optical signals for data communication between an ONU and the OLT.

7. The method of claim 5, wherein the information relating to the respective branch power comprises link attenuation of an individual or a group of the ONUs.

8. The method of claim 1, wherein the distributive element is controllable and provides an asymmetrical splitting ratio distribution among the second ports of the distributive element, the method further comprising adjusting a splitting ratio of one or more of the second ports of the distributive element.

9. The method of claim 1, wherein the adjusting of the respective branch power for the one or more of the ONUs further comprises applying optical amplification to one or more of the second ports of the distributive element for the respective one or more of the ONUs and adjusting the respective optical amplification for the one or more of the ONUs, and/or the adjusting of the respective branch power further comprises adjusting a respective optical signal-to-noise ratio, OSNR for the one or more of the ONUs.

10. The method of claim 1, wherein the one or more optimization parameters are associated with throughput maximization according to a bandwidth request from the plurality of ONUs, or green PON network system operation.

11. A system for managing traffic flow in a passive optical network, PON, comprising an optical line terminal, OLT, connected to a plurality of optical network units, ONUs, via an optical distribution network, ODN, having a distributive element, the system comprising:
a system control means located at the OLT; and
a distribution control means located at the distributive element,
the distributive element having a first port associated with signal transmission between the OLT and the ODN via a first optical link and a plurality of second ports each associated with signal transmission between the ODN and a respective ONU or a respective group of ONUs via a respective second optical link,
wherein each of the second ports of the distributive element is associated with a respective power distribution ratio of optical power at that second port to optical power at the first port of the distributive element, and
wherein the system control means comprises:
a PON control unit configured to:
obtain one or more optimization parameters for a target state of the PON; and
determine, for one or more or each of the ONUs, a respective modulation scheme for communicating data between the OLT and that ONU via the first optical link and the respective second optical link; and
an ODN control unit configured to:
obtain the determined modulation scheme from the PON control unit; and
determine the respective power distribution ratio for one or more of the ONUs based on the determined modulation schemes and the one or more optimization parameters, and
wherein the distribution control means is configured to:
adjust a respective branch power for the one or more of the ONUs based on the determined power distribution ratio for communicating data between the OLT and the one or more of the ONUs.

12. The system of claim 11, wherein the PON control unit is further configured to obtain the determined power distribution ratio from the ODN control unit and to determine the respective modulation schemes based on the determined power distribution ratio, wherein the system control means is configured to vary the respective modulation schemes and/or the respective power distribution ratio until the target state of the PON is reached.

13. The system of claim 11, wherein:
the PON control unit is further configured to:
determine for each of the ONUs, a respective coding scheme and/or one or more respective forward error correction, FEC, parameters for communicating data between the OLT and that ONU; and
provide, to a Media Access Control, MAC, layer of the PON, the determined modulation schemes, the determined coding schemes, and/or the determined FEC parameters to the ONUs, and
the ODN control unit is further configured to:
provide the determined power distribution ratio to the MAC layer of the PON for sending the determined power distribution ratio to the distribution control means for adjusting the respective branch power; and
determine the respective power distribution ratio for the one or more of the ONUs based on the determined coding schemes and/or the determined FEC parameters.

14. An optical line terminal, OLT, for data communication with a plurality of optical network units, ONUs, in a passive optical network, PON, via an optical distribution network, ODN, the OLT comprising:

a control interface configured to obtain one or more optimization parameters for a target state of the PON;

a PON control unit configured to determine one or more modulation schemes for communicating optical data between the OLT and one or more of the ONUs; and an ODN control unit configured to:

obtain the determined one or more modulation schemes from the PON control unit; and determine, based on the determined one or more modulation schemes and the one or more optimization parameters, a respective power distribution ratio for the ODN for communicating the optical data with the one or more of the ONUs.

15. A distributive element for an optical distribution network, ODN, for data communication between an optical line terminal, OLT, and a plurality of optical network units, ONUs, in a passive optical network, PON, the distributive element comprising:

a first port associated with signal transmission between the OLT and the ODN via a first optical link;

a plurality of second ports each associated with signal transmission between the ODN and a respective ONU or a respective group of ONUs within the PON via a respective second optical link; and a distribution control means configured to:

obtain, from the OLT, a respective power distribution ratio for each of the second ports, wherein the respective power distribution ratio is based on one or more optimization parameters for a target state of the PON obtained at the OLT and modulation schemes determined at the OLT for communicating data between the OLT and the respective ONU via the first optical link and the respective second optical link; and adjust a respective branch power for one or more of the ONUs based on the obtained respective power distribution ratio for communicating data between the OLT and the one or more of the ONUs.

* * * * *